United States Patent [19]

Mäkinen et al.

[11] Patent Number: 5,354,976
[45] Date of Patent: Oct. 11, 1994

[54] METHOD FOR IDENTIFICATION OF ROLLS AND A DEVICE FOR ITS ACCOMPLISHMENT

[75] Inventors: Jukka Mäkinen, Hollola; Jorma Hännikäinen, Lahti; Mika Uusitalo, Torpinkylä, all of Finland

[73] Assignee: Valmet Paper Machinery Inc.

[21] Appl. No.: 42,886

[22] Filed: Apr. 5, 1993

[30] Foreign Application Priority Data

Apr. 10, 1992 [FI] Finland .................................. 921587

[51] Int. Cl.⁵ .............................................. G06K 7/10
[52] U.S. Cl. ..................................... 235/462; 414/911; 250/566; 318/568.16; 318/568.17
[58] Field of Search ....................... 395/82, 83, 84, 94, 395/97; 235/462, 487; 414/911, 910, 652, 654; 250/566; 318/568.11, 568.16, 568.17

[56] References Cited

U.S. PATENT DOCUMENTS

| | | | |
|---|---|---|---|
| 4,463,251 | 7/1984 | Koutonen et al. | 235/470 |
| 4,730,438 | 3/1988 | Koutonen | 53/409 |
| 4,896,024 | 1/1990 | Morello et al. | 235/381 |
| 4,903,815 | 2/1990 | Hirschfeld et al. | 194/205 |
| 5,085,377 | 2/1992 | Rohrer et al. | 242/58.6 |
| 5,193,973 | 3/1993 | Tübke | 414/792.9 X |

FOREIGN PATENT DOCUMENTS

3322193   1/1985   Fed. Rep. of Germany .
58-182785 10/1983   Japan .

Primary Examiner—Donald Hajec
Assistant Examiner—Adrian Young
Attorney, Agent, or Firm—Cohen, Pontani, Lieberman, Pavane

[57] ABSTRACT

A method for identification of a roll and for determining its diameter, in which a device for reading the identifier and the sensor for measuring the diameter are mounted to a unit moving on a vertical lead, and its position is tracked by a position sensor. The diameter of the roll is detected by a mechanical detector that turns up when it contacts the surface of the roll enabling thus an uninterrupted movement of the unit past the measurement site. After the measurement of the diameter the identification unit moves to the center of the roll, inferred from the diameter, where the device for reading the identifier reads the identification code of the roll. During the return movement of the identification unit, markings can be made on the end of the roll by an ink-jet printer.

13 Claims, 2 Drawing Sheets

METHOD FOR IDENTIFICATION OF ROLLS AND A DEVICE FOR ITS ACCOMPLISHMENT

BACKGROUND OF THE INVENTION

The present invention relates to a method for identification of paper rolls and similar objects on various roll handling lines.

Paper rolls produced for various deliveries in a paper mill have different mass, diameter, and weight almost for each roll depending on what kind of rolls were ordered. Depending on for which consignment paper is produced, unit weight and consistency of paper in rolls vary, and clients have also different requirements on packaging. Generally for longer transporting distances tougher package is used than e.g. for domestic shippings. Those properties of a roll will be saved with the data of the client in a data system of the factory and for each roll an identifier is produced that can be used to connect the roll with its identification dam all the way from the manufacturing to the delivery to the client. In new systems various kinds of bar codes that are attached on the end of the roll core are used almost exclusively as identifiers at the moment.

On a roll packing line before a wrapping station is an identification station where the diameter of the roll is measured and the identification code is read. The measured diameter is compared with corresponding data in the identification code to ascertain that the identifier is correctly read and the roll coming to the wrapping station is the right one. To read the identification code, its location must be known, and the sensor reading the code has to be directed to the corresponding location on the end of the roll. Alternatively the code can be read by a scanning detector, e.g. by a laser beam, that wipes across all the end of the roll. For safety reasons the beam can not wipe over the edges of the roll's end. The diameter of the roll must thus be known.

U.S. Pat. No. 4,463,251 describes a method where the code reader head is directed on the location of the identification code by the diameter of the roll. In this method the bar code used as an identifier is situated on the center of the roll. The reader head is positioned by lowering the arm of the diameter measuring device onto the roll and stopping it there. The motion of the reader head and the diameter measuring device is synchronized e.g. by cogged belt transmission so that the path of the arm is halved for the reader head, in doing which a movement of the arm in length of the diameter of the roll is divided to the reader head's movement in length of the roll's radius. The movement of the arm is stopped by a limit switch and after that the location of the arm is measured. To identify the roll the diameter is compared with the identification code, after doing which type and amount of the wrapper can be reported to the wrapping station. This device is usually equipped with an ink-jet printer that prints so-called inner markings, e.g. arrow showing the direction of opening the roll.

The method for measuring the diameter utilizing a firm measuring arm is the most reliable method at the moment. The diameter is measured also by other means: ultrasonically, using photodetectors or other equivalent detectors. Common for all of the measuring methods is that the sensor is moved in relation to the roll and the movement is interrupted when the surface of the roll is detected. The reader head of the identification marking is directed on the center of the roll either synchronously with the measuring movement or utilizing a special moving and positioning device. The non-contacting measuring method is not capable to detect reliably measurement errors caused by loose paper.

This method of measurement has many disadvantages; the most important of them is the slowness. When the measurement arm and sensor are approaching the estimated diameter, the movement must be slowed down to avoid collision. Because the diameter can not be accurately estimated beforehand, the slowed motion will be long. That of course slows down the functioning of the station unnecessarily. The slowness of the measurement station may thus act as a bottle-neck on the fastest packing lines. If increase in the speed of the station is desired, the transfer speed of the measurement arm must be increased, for what additional sensing, more powerful transfer devices and a complicated control mechanism are needed. The increase in speed will thus raise the price of the equipment but the benefit gained will be limited, however. If the movement of the reader head is synchronized with the diameter measuring device, the movement of the reader head can not be used to move the ink-jet printer, but the printer must have a separate moving mechanism. This adds to the number of the parts needed and complicates uselessly the construction of the device.

SUMMARY OF THE INVENTION

The aim of the present invention is to accomplish a method for identification that makes it possible to increase substantially the speed of the identification station.

The invention is based on mounting the identification reader device and the diameter measurement sensor on a unit that is moving on a vertical lead and is tracked by a position sensor. The diameter of the roll is detected by a mechanical detector, that turns up after touching the surface of the roll enabling thus the unit to pass the measurement site without stopping.

More specifically, the method in accordance with the invention is characterized by measuring the position of the identification device continuously during its movement toward the center. The passing of the outer edge of the roll of the identification device is detected by a mechanical sensor arm that contacts the surface of the roll. The sensor arm can rise tip to enable the identification device to move toward the center of the roll. The diameter of the roll is determined by the position of the sensor arm at the moment contact. The obtained diameter is then divided by two and on the basis of this information the code reader of the identification device reads the code on the roll.

Correspondingly, the device in accordance with the invention is characterized by an arrangement for continuously measuring the position of the identification unit or device during the movement towards the center of the roll. The sensor arm is mounted to the identification unit and at least one sensor detects displacement of the sensor arm when it touches the roll surface during movement of the identification unit.

The invention provides outstanding benefits.

This method enables identification of a roll very quickly. If the identifier utilizes a bar code that is twice higher than its width and if a reader head a laser/CCD detector having two crossing beams is used, the detector unit can be driven directly from in its upper position past the measurement site, the identification code can be read on the move, and during the return movement the inner markings can be printed by a ink-jet printer. That way, the mechanical speed of the identification station is sufficient for all modem applications. In this case, the highest working speed is limited by the capacity of the controller computer, or practically, by the ability of the computer to produce the data for inner markings for the ink-jet printer quickly enough.

The construction of the device is less complicated than that of the prior art identification stations. All the necessary devices can be assembled as a separate unit in a moving carriage of the reader head. There is thus no need for a special positioning mechanism, e.g. for the ink-jet printer. Because the stationing of the unit is continuously tracked by the position sensor, the measurement of the diameter must not be mechanically synchronized with reading of the identifier. All necessary positioning information of the unit is obtained by one reading of the position sensor. More sensors are needed only when more measures than diameter have to be read at the identification station. For example, the length of the roll can be measured by mounting an applicable position sensor to the approaching motor or to its support rail, and an applicable limit switch is used to detect the reaching of the identification unit of the end of the roll.

The invention is next explained in detail with the help of the attached drawings.

DETAILED DESCRIPTION OF THE PREFERRED EMBODIMENTS

Figure 1:
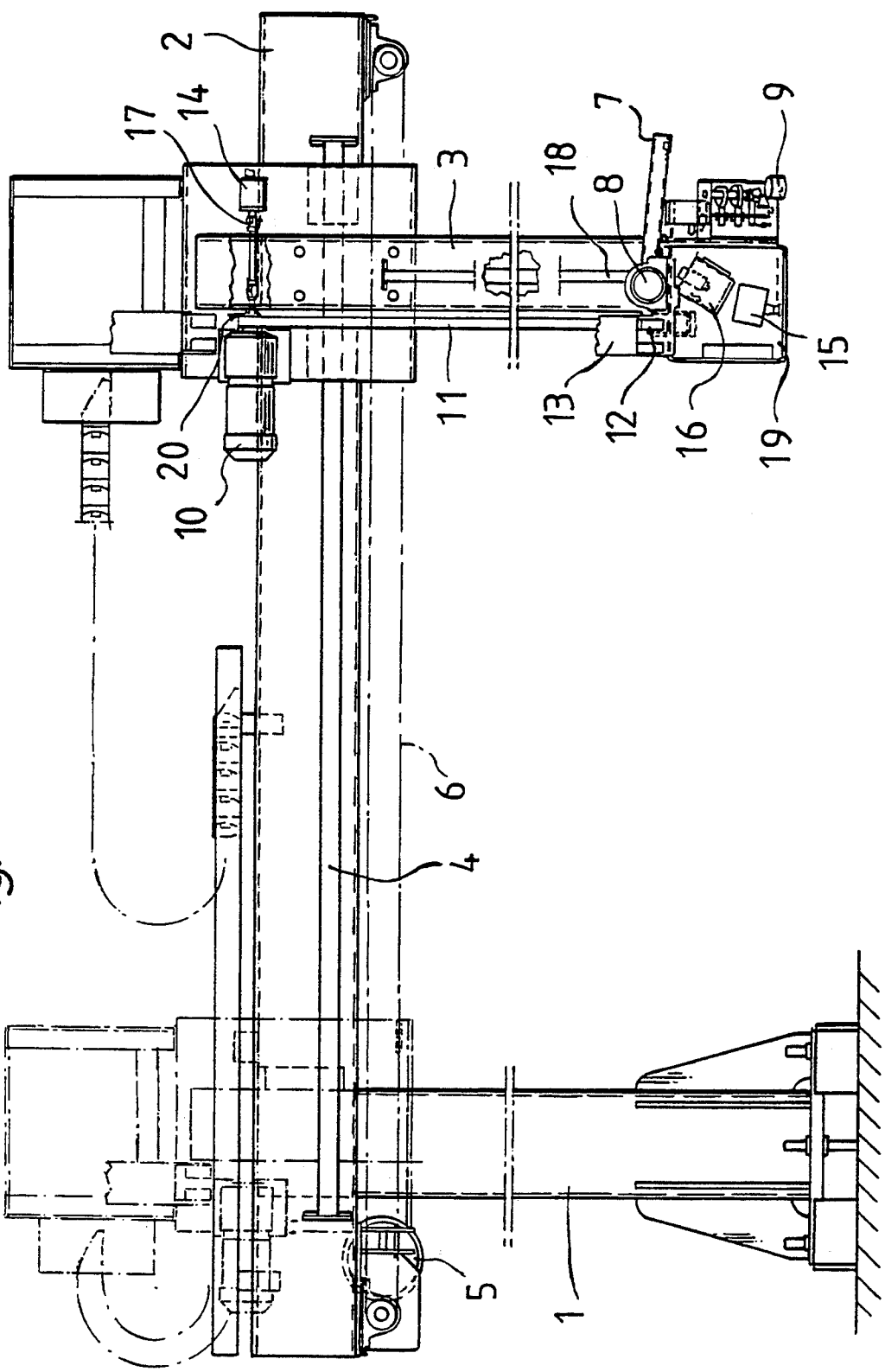
FIG. 1 is a sectional view of an embodiment of the invention.

The device shown in figures is based on portal construction. Horizontal beam 2 of the portal is in this case mounted on one vertical post 1. Horizontal beam 2 has lead 4 and vertical beam 3 of identification device 19 moves on lead 4 of the horizontal beam in the longitudinal direction of beam 2. Vertical beam 3 is moved by cogged belt 6 driven by electric motor 5. Vertical beam 3 of the identification unit is mounted on lead 4 of horizontal beam 2 by firmly to gear belt 6. On the side of vertical beam 3 is vertical lead 18, on which identification unit 19 is mounted.

Vertical movement of identification unit 19 is accomplished by means of cogged belt 11. Cogged belt 11 winds around pulley 21 at lower part of vertical beam 3 and at the upper part of vertical beam 3 around pulley 20 and it is protected by casing 13. Pulley 20 is mounted on axle 17 of gear-head motor 10, where also position sensor 14 is mounted. Identification unit 19 is fastened to cogged belt 18 by means of connecting piece 12.

The sensors used for identification and measuring the roll are assembled into identification unit 19. In this embodiment, for detecting the head of the roll a photodetector is used as approach switch 16 and for detecting the contact a mechanical limit switch 9 provided with an arm is used. The bar code on the roll's end is read by laser reader 15. The diameter is measured by detecting the displacement of sensor arm 7 when it touches the surface of the roll. Sensor arm 7 is mounted by means of bearing 8 on the case of identification unit 19 and between the arm and the case is mounted pneumatic turning cylinder 23.

Figure 2:
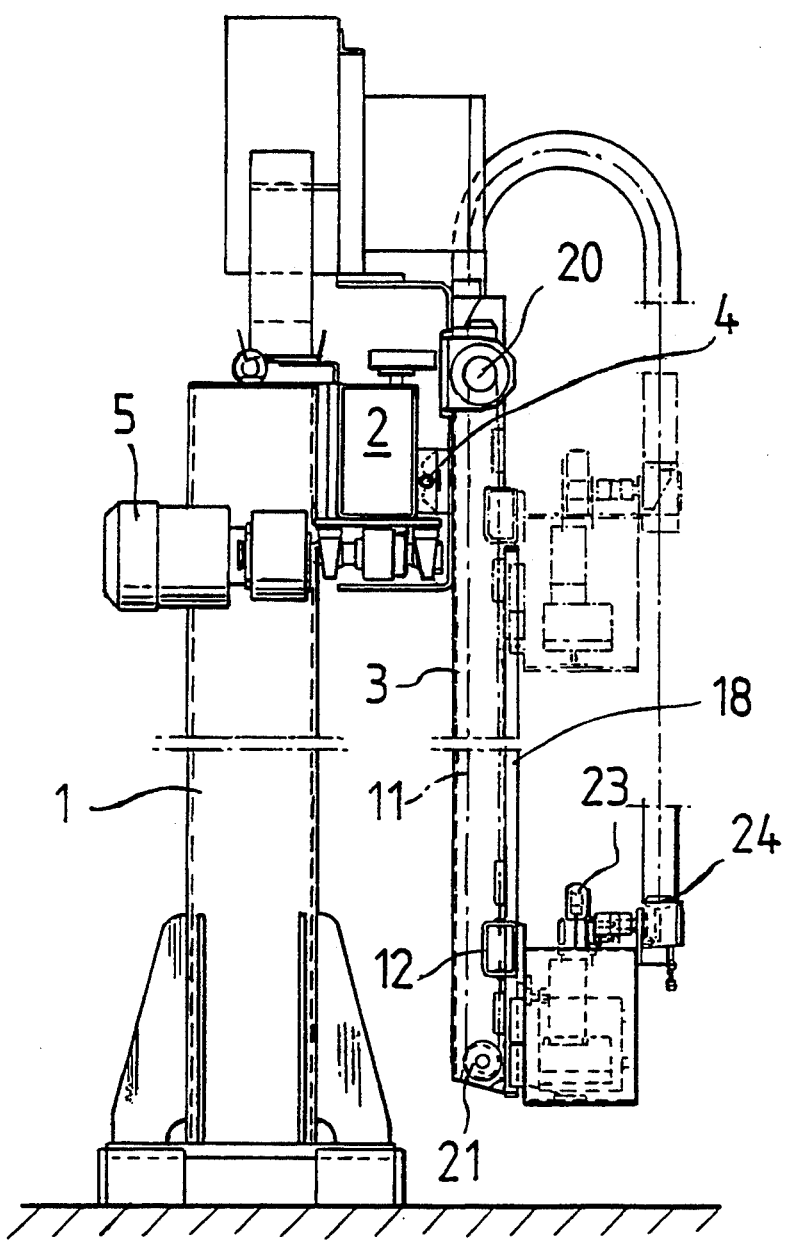
FIG. 2 is a frontal view of the device illustrated in FIG. 1.

Identification of a roll by means of the device illustrated in FIG. 1 and 2 is done as follows:

The arrival of a roll to be identified is detected and a notice about the arrival is sent to the control system of the identification station. After the notice identification unit 19 with its vertical beam 3 moves on lead 4 of horizontal beam 2 towards the end of the roll. Photodetector 16 in identification unit 19 is adjusted to detect the light reflected from the end of the roll at a predetermined distance. When photodetector 16 detects that the end of the roll is near, the control system reduces the rotation speed of motor 5 and identification unit 19 makes the final approach on a crawling pace. The arm of mechanical limit switch 9 has turned forward in the direction of movement and when the arm touches the end of the roll, the approaching is stopped. At that position identification unit 19 is near the upper edge of the roll and arm 7 of the diameter detecting device points somewhat lower towards the upper surface of the roll.

On the next stage of the identification the diameter of the roll is detected. Now identification unit 19 moves downwards on lead 18 of vertical beam 3. Unit 19 is driven by means of cogged belt 11 actuated by electric motor 10, on axle 17 of which is mounted position sensor 14. Sensor 14 counts continuously revolutions of motor 10 and the position of identification unit 19 is continuously detected by means of reading of sensor 14. Sensor 14 acts as a position sensor, whose reading gives the position of identification unit 19, by means of which the diameter of the roll is directly obtained.

The diameter is detected by means of the displacement of sensor arm 7 of the detecting device. As mentioned above, arm 7 points downwards at the beginning of the movement. During the downward movement of identification unit 19 the position of arm 7 and the reading of position sensor 14 are continuously detected. When arm 7 touches the upper surface of the roll, it turns around bearing 8 against the force of turning cylinder 23. The restraining force of turning cylinder 23 is small and arm 7 can turn without obstruction. The turning of arm 7 away from its standby position is detected by border switch 24, and the reading of position sensor 14 at that moment is registered and thus the diameter of the roll is directly obtained.

After measurement of the diameter identification unit 19 continues its movement downwards without an interruption. When the limit switch detecting the turning of arm 7 notices that arm 7 touches the surface of the roll, the steering valve of turning cylinder 23 of arm 7 will be given a command, and the valve takes such a position that arm 7 of the detector turns to the upper position and identification unit 19 can move freely downwards. Thus, no interruption of the movement of the identification unit 19 is needed for detecting the diameter.

Next the bar code attached on the end of the roll is read and compared with the diameter of the roll. Now the diameter of the roll is known and the control system divides the diameter by two and steers on basis of this information by means of motor 10 and position sensor 14 laser reader 15 near the center of the roll.

Identification unit 19 is stopped and the laser beam of reader 15 will be diverted in such a way that the code can be read. When the code is read, identification unit 19 continues its movement downwards or returns up depending on whether unit 19 has a printer for printing the roll-end marking. Constructionally, e.g. ink-jet printer can always be coupled with the device in accordance with the invention. However, for producing the printer output file a remarkable computer capacity is needed in a short period of time, so that the response time of the computer system of the factory must be short enough to enable controlling the printer. If the computer capacity is not sufficient, the roll-end markings have to be printed at a separate station.

In the simplest embodiment the device in accordance with the invention comprises only the diameter detecting device and the code-reader device that reads the identification code by beam diverting. The fastest functioning is achieved by a device, where the bar code is read by crossing beams and the roll-end marking is printed during the return movement of identification unit 19. This kind of device enables reading of the code on the move, that makes the functioning as fast as possible. The speed of the device is limited practically by the printing speed of the printer, so that the identification station does not act as a bottle-neck even on fastest packing lines. Utilizing such an arrangement, such a bar code must be used that has a height twice as much as its width. In addition, a factory computer with a sufficiently fast reponse time is needed.

The station in accordance with the invention enables to measure also the length of the roll if the position of the longitudinal movement is measured. The measurement can be accomplished in a similar way like the measurement of the diameter. e.g. by mounting a sensor on the axle of motor 5 causing the movement and detecting the contact with the end of the roll by mechanical limit switch 7 belonging to the device. In this case the roll must be centered on a known position or there must be another measurement device on the other side of the roll that measures the position of the other end from a zero point. The length of the roll is then calculated from the detected position information of the ends of the roll. Because construction of the device requires a large amount of various mechanical components, it is obvious, that each component can be replaced by a functionally analogous element, while the idea of the invention remains unchanged. For example mechanical, photoelectric, inductive, and other limit switches are in general interchangeable. Also the position measurement can be made in many ways. The movements of the device illustrated in figures are accomplished by portal technique on linear leads. Because of space limitations or for other reasons there may be need to carry the movement out by other mechanisms that are able to accomplish necessary movements, e.g. advantageously by pistonless pneumatic cylinders.

The mechanism for detecting the diameter described above can be replaced e.g. by a limit switch having a press roller on its arm. However, while the identification unit is moving, the press roller presses the end of the roll to be identified, that can cause damage to the roll. The arm turning on a joint can be replaced with an arm that moves freely on a vertical lead and after touching the roll starts sliding along the lead. The touch can be detected by a sensor or by a switch mounted on the arm or e.g. by a limit switch situated near the lead, detecting the displacement of the sensor arm.

What is claimed is:

1. A method for identification of a roll and for determining its diameter by an identification device that comprises at least mechanisms for detecting the diameter of the roll and for reading the code marking on the roll, comprising the steps of:
    driving the identification device towards the end of the roll to be identified;
    detecting the arrival of the identification device to the vicinity of the end and interrupting the approaching movement;
    moving the identification device towards the center of the end of the roll;
    measuring the position of the identification device continuously during the movement towards the center;
    detecting passing of the outer edge of the roll of the identification device with a mechanical sensor arm that contacts the surface of the roll and that by rising up enables the identification device to move further towards the center of the roll;
    determining the diameter of the roll by the position of the sensor arm of the identification device at the moment of contact; and
    dividing the obtained diameter by two and on the basis of the information steering the code reader of the identification device to read the identification code on the center of the end of the roll.

2. A method as claimed in claim 1, including stopping the identification device at the center of the roll for reading the identification code.

3. A method as claimed in claim 1, including driving the identification device continuously past the center of the roll and reading the identification code on the move.

4. A method as claimed in claims 1, 2 or 3, including driving the identification device at the identification stage to the opposite edge of the roll and returning the identification device back along the same path simultaneously printing a marking on the end of the roll.

5. A method as claimed in claim 1, including measuring the position of the identification device continuously during the movement towards the end of the roll, detecting arrival of the identification device to the end of the roll by a limit switch, and using the information about the position of the identification device at the moment of the pulse to determine the length of the roll.

6. A method as claimed in claim 1, including turning the sensor arm away from the surface of the roll after the moment of contact by a mechanical device.

7. A method as claimed in claim 4, including printing a marking on the end of the roll with an ink-jet printer.

8. A method as claimed in claim 6, wherein the mechanical device is a pneumatic turning cylinder.

9. A device for identification of a roll and measurement of its diameter, comprising:
    an identification unit (19) comprising means for detecting the diameter of the roll, for reading a coded marking on the roll (15), and for detecting the vicinity to the end of the roll (9, 16);
    means (4–6) for driving the identification unit (19) towards the end of the roll
    means (10–12, 20, 22) for moving the identification unit (19) towards the center of the end of the roll:
    means (14) for continuous measuring of the position of the identification unit (10) during the movement towards the center of the roll;
    a sensor arm (7) mounted on the identification unit (19) that is able to turn around a joint point (8) or to move in the opposite direction related to the movement of the identification unit (19) is near the end of the roll; and
    at least one sensor for detecting the displacement of the sensor arm (7) when it is touching the surface of the roll during the movement of the identification unit.

10. A device as claimed in claim 9, characterized in that the means for detecting the diameter of the roll comprise arm (7) mounted at its end by a bearing to identification unit (19), at least one sensor (24) for detecting displacement of the arm, and turning cylinder (23) coupled to the arm, that is used to turn arm (7) from the first position where it points towards the roll to be identified, to the second position, where it turns upwards and is turned away from the roll to be identified.

11. A device as claimed in claim 7, characterized in that the means for detecting the diameter of the roll comprise a linear lead, to which the sensor arm is mounted enabling it to move freely, and at least one sensor for detecting the displacement of the arm at the moment of contact.

12. A device as claimed in claim 9, characterized in that the means for detecting the diameter of the roll comprise a mechanical lever type border switch. lever of which acts as a sensor arm detecting the diameter of the roll.

13. A device as claimed in claims 9, 10, 11 or 12, characterized by means for continuous measurement of the position of identification unit (19) and for detecting the position of the roll (9), whereas the length of the roll can be measured by a similar method as the diameter.

* * * * *